3,480,442
PROCESS FOR PREPARING A HIGH PROTEIN SNACK
William T. Atkinson, Minneapolis, Minn., assignor to Archer-Daniels-Midland Company, Minneapolis, Minn., a corporation of Delaware
No Drawing. Filed June 22, 1966, Ser. No. 559,428
Int. Cl. A23j 1/02, 1/04, 1/14
U.S. Cl. 99—17                                      6 Claims

ABSTRACT OF THE DISCLOSURE

A process for the preparation of a friable, crisp, edible snack in which the cells are of random distribution and size of high protein content obtained by extruding a protein mix of a solid protein derivative having a protein content of at least 30% by weight of the solid and from 12 to 20% by weight of the mix of water at a temperature of 200 to 480° F. at a pressure of at least 1000 p.s.i.

---

The present invention relates to a friable, crisp, edible snack of high protein content and to the preparation of such by an extrusion process.

The preparation of expanded, cellular carbohydrates in the form of cheese and meat-flavored snacks by the so-called puffing techniques is known in the art. Such techniques are, however, not satisfactory in the preparation of expanded, cellular products from edible, bland protein derivatives such as extracted oil seed proteins, fish proteins, and animal proteins. Nevertheless, it would be highly desirable to produce such protein snacks in view of the high nutritional value and low caloric content of the described protein derivatives.

It is therefore an object of the present invention to provide an expanded, cellular snack of high protein content which is crisp and friable.

It is another object of the present invention to provide a process for preparing such a snack.

Other objects will become apparent from the following description and claims.

The high protein content snack of the present invention comprises a friable, expanded protein food product having an open cell structure of random distribution and size which is obtained by extruding a protein mix comprising a protein derivative with from 12 to 20% by weight of the mix of water through an orifice under a pressure of at least 1000 p.s.i. at a temperature of 200 to 450° F., said protein mix being maintained at a pH of 5 to 8.5.

In copending application Ser. No. 369,189, filed May 21, 1964 now abandoned, the preparation of a resilient, chewy, expanded protein product, defined as plexilamellar protein, is described which not only is hydratable but, further, on hydration, has the texture of cooked meat. In addition to being coherent and resilient, the plexilamellar protein described in said application is characterized by an open cell structure in which the cells have a greater length in the direction of extrusion than average width as measured in the transverse direction. In contrast to plexilamellar protein, the product of the present invention is characterized by crispness, friability, and a more random cellular structure. The differences in the texture and physical properties of the protein snack of the present invention and plexilamellar protein are believed to be the result of differences in the conditions at which each of these products is extruded. The process described in said copending application requires the mixture of protein and water to be masticated at the elevated temperatures and pressures until a plastic mass exhibiting plastic flow is formed which is simultaneously subjected to unidirectional flow and then extruded through an orifice. In the process of the present invention, however, the protein mix contains a lower concentration of water and is extruded at generally higher pressures, which is believed to prevent the formation of a plastic mass having plastic flow and its orientation when subjected to unidirectional flow, even through extrusion equipment containing mixing sections is employed which, at a higher water content of the protein mix, would result in plexilamellar protein. On the other hand, it is to be recognized that the extrusion involved in the process of the present invention does not require a masticating or mixing zone in the extruder and thus permits the use of less sophisticated, simpler extrusion devices. It is believed, therefore, that the structural differences between these two products are based on the orientation of the protein molecules occurring in the process. Molecular orientation, if any, in the product of the present invention is more random, whereas the orientation of plexilamellar protein is unidirectional, i.e. in the direction of extrusion.

Equipment which is capable of heating the protein mix to or maintaining such at the required temperatures, of exerting the pressures above indicated and of pushing the heated, pressurized protein mix through an orifice into the atmosphere can be suitably employed in the process of the present invention. The extruder employed need not necessarily be a screw extruder but ram extruders and other machines known to those skilled in the art can equally well be employed. Because of the high degree of compaction, i.e. extrusion pressure, and the low plasticity of the protein mix employed in the present invention, extruders normally employed in the extrusion of thermoplastic resins do not have sufficient power to continuously push the protein extrudate of the present invention out of the extrusion orifice.

As a result of the pressure drop across the extrusion orifice, the water dissolved in the protein or finely distributed throughout the protein mix vaporizes and causes the extrudate to expand into the cellular product of the present invention.

The process of the present invention is not limited to any particular type of protein. Any type of edible protein of vegetable, fish, or animal origin can be employed. The term "protein derivative" as employed herein is intended to define an edible product having a protein content of at least 30% by weight. The protein can be employed in substantially pure or water-soluble form or, as is preferred, in the form of flakes or flour, generically herein referred to as meal, in which the protein is in admixture with other ingredients. The preferred protein derivatives, from the standpoint of an optimum product, are solvent extracted oil seeds such as peanuts, cotton seeds, sesame seeds, or soybeans. Solvent extraction of oil seeds to remove oil and other fatty materials is well-known in the art and thus need not specifically be described here. The preferred oil seed meals are those which have a protein content of 40 to 70% by weight. If desired, such protein means can be diluted with non-proteinaceous fillers such as corn, sorghum, tapioca, rice, potato, wheat or bran. In general, the protein concentration of the protein derivative employed in the extrusion should not be decreased below 30% by weight in view of the decreased nutritional value and increased caloric content of such blend.

The total concentration of water in the protein mix is, as indicated, from 12 to about 20% by weight of the mix. The water is necessary to obtain a coherent product and cause the expansion of the extrudate. Not all of this water, however, is available for the expansion of the extrudate, some of the water being retained by the protein molecules as nonreleasable water. The extent of nonreleasable water depends on the specific nature of the protein involved as well as on the extrusion temperature, generally decreasing with increasing extrusion temperatures. The amount of nonreleasable water can be established by careful drying methods known to those skilled in the art. Sufficient water is added above this level to permit the extrusion of a coherent extrudate. The water content of the mix should, however, not be increased to the extent that orientation causing plastic flow is induced, since such will result in the resilient, plexilamellar protein described above. The upper water level will, therefore, depend to a certain degree on the type of equipment employed. If the equipment contains no masticating, unidirectional flow-imparting zone, a higher water concentration above 20% can be employed.

The expansion of the extrudate normally occurs at atmospheric pressure and the minimum temperature to which the protein mix must be heated is the boiling point of water, i.e. 212° F. Application of a vacuum to the extrudate may, of course, allow the use of somewhat lower temperatures such as 200° F. An increase in the extrusion temperature, other variables being maintained constant, will result in a finer celled structure. The upper limit of the extrusion temperature is dictated by the stability of the protein mix. Thus, the temperature should not be so high as to cause substantial degradation of the protein or any additive being present. Within the operable temperature range, temperatures are adjusted in order to result in the desired cellular structure in the extrudate. In general, extrusion temperatures, i.e. the temperature of the protein mix at the extrusion orifice, are maintained within a range of 200 to 450° F., and preferably within a range of 240 to 350° F.

The extrusion pressure, or, more specifically, the pressure drop across the extrusion orifice, employed in the process of the present invention is at least 1000 p.s.i. and generally in the range of 1000 to 25,000 p.s.i. As indicated above, such high pressures are necessary to form a continuous extrudate from the protein mix which, because of its low water concentration, exhibits a low order of plastic flow. Hence, any pressure above 1000 p.s.i. which is capable of continuously pushing the protein mix through the orifice can be suitably employed. A further increase in the pressure generally results in a higher extrusion rate. The upper limit of extrusion pressure is generally caused by the limitations of the design of the equipment employed, although the pressure should not be so high as to result in a discontinuous extrudate. The design of the extrusion orifice is a matter of choice and can vary from a slit or band orifice to a circular or square orifice. A die containing a multiplicity of orifices can be employed. In general, the resulting extrudate is cut into the desired size for the intended application.

In order to maintain the friability and crispness as well as the blandness of taste of the extrudate, the pH of the protein mix is adjusted to be within the range of 5.0 to 8.5, and preferably within the range of 6.5 to 7.5. At pH levels below 5.5, the extrudate can lose its crispness and assume a sour taste. At a pH level above 8.5, a bitter tasting extrudate is frequently obtained, making the product unsuitable for consumption. Protein derivatives obtained by the solvent extraction of oil seeds are generally too acidic for the blandness desirable in the unflavored product. Hence, a base such as sodium hydroxide is generally added to the protein mix in order to raise the pH to within the desired range.

If the extrudate does not have the desired crispness, edible metal salts such as sodium chloride, potassium chloride, or calcium chloride can be added to the protein mix. The addition of such salts, generally employed in concentrations of up to 3% based on the weight of the protein mix, tends to further reduce plastic flow in the protein mix, thereby increasing the friability of the extrudate.

In some instances it may be desirable to prepare a protein snack product which has a lower density than is obtained by expanding the product with steam. Lower density products can be readily prepared by adding to the protein mix auxiliary blowing agents such as sodium carbonate, which decompose during the heating of the protein mix to form inert gases, e.g. carbon dioxide, which causes a greater degree of expansion in the extrudate.

The protein extrudate obtained by the process of the present invention is normally bland and of white to light tan color, depending on the protein derivative employed to form the protein mix. Flavoring agents and food dyes are normally added to the protein mix to prepare a protein snack of particular taste and color.

The formation of the protein snack of the present invention is further illustrated by the following examples in which all parts are by weight unless otherwise stated.

EXAMPLE 1

Into a ribbon blender maintained at 120° F. was charged 5675 g. of "Ardex 550" flakes, a commercially available soybean product containing 50% of soy protein and 9.5% of moisture, 20 g. of imitation hickory smoked flavor, 505 ml. of water, and 1.8 g. of "Tween #40," a commercially available detergent used for the distribution of the flavor in the mix. The resulting mix was blended until uniform, and 25 g. of sodium hydroxide flakes (97%) was added. Blending was continued for an additional 7 to 8 minutes. To the resulting blend was then added a dye solution containing 1.1 g. of FD&C Red #3 dye in 250 ml. of water. Blending was continued until the dye was uniformly dispersed throughout the resulting protein mix. The protein mix was extruded, cut and cooled to room temperature by the following procedure. The protein mix was charged to a Kell Dot extruder, maintained at a temperature of 275 to 300° F., and extruded at that temperature through a die containing an orifice. The extrudate expanded on emerging from the extrusion orifice and on cooling to room temperature resulted in a friable, open celled structure which disintegrated readily when chewed.

Similar results are obtained if instead of the soy flakes used in the foregoing examples, other defatted vegetable proteins or animal or fish proteins are employed. Various modifications in the extrusion procedure and the extrusion equipment will be apparent to those skilled in the art and it is, therefore, not intended to limit the scope of the present invention to the particular embodiments shown in the foregoing examples.

What is claimed is:

1. The process of preparing a friable, expanded protein food in which the cells are of random distribution and size which comprises extruding a protein mix of a solid protein derivative having a protein content of at least 30% by weight of the solid and from 12 to 20% by weight of the mix of water through an orifice at a pressure of at least 1000 p.s.i. and at a temperature of 200 to 450° F. into a substantially atmospheric environment.

2. The process of claim 1 wherein the protein derivative is a vegetable protein derivative having a pH on the range of 6.0 to 7.5.

3. The process of claim 2 wherein the vegetable protein is a soy protein meal.

4. The process of claim 1 wherein an auxiliary blowing agent is employed.

5. The process of claim 1 wherein the extrusion is conducted at a temperature of 240 to 350° F.

6. The process of claim 1 wherein the protein content of the protein derivative is from 40 to 70% by weight.

References Cited

UNITED STATES PATENTS

| | | | |
|---|---|---|---|
| 2,682,466 | 6/1954 | Boyer | 99—14 |
| 3,047,395 | 7/1962 | Rusoff et al. | 99—14 |
| 3,102,031 | 8/1963 | MacAllister et al. | 99—14 |
| 3,119,691 | 1/1964 | Ludington et al. | 99—2 |
| 3,139,342 | 6/1964 | Linskey | 99—2 |
| 3,142,571 | 7/1964 | McAnelly | 99—14 |

FOREIGN PATENTS 1,049,848  11/1966  Great Britain.

OTHER REFERENCES

"Food Engineering," vol. 38, No. 5, pp. 82–84, 87 to 90 and 93, May 1, 1966.

MAURICE W. GREENSTEIN, Primary Examiner

H. H. KLARE III, Assistant Examiner

U.S. Cl. X.R.

99—14